L. BISSELL.
Car Truck.
No. 17,913. Patented Aug. 4, 1857.
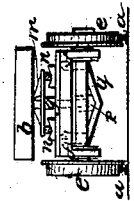
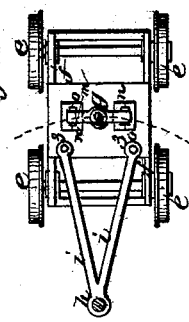
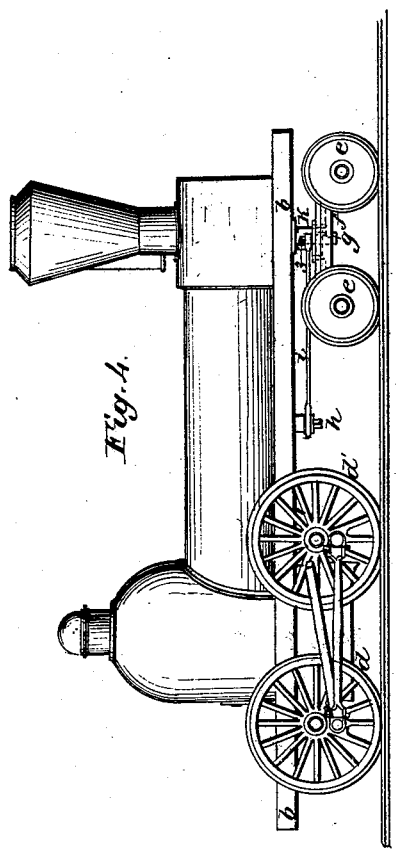
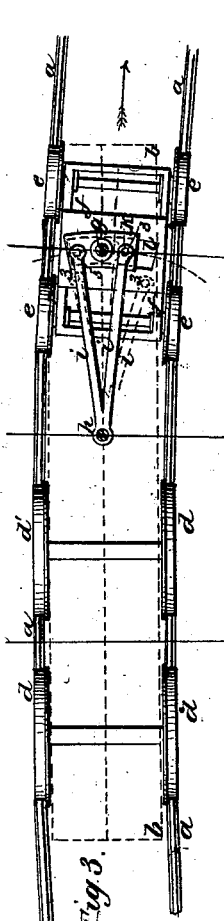
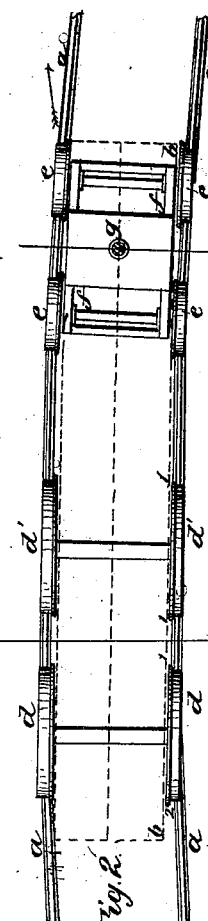
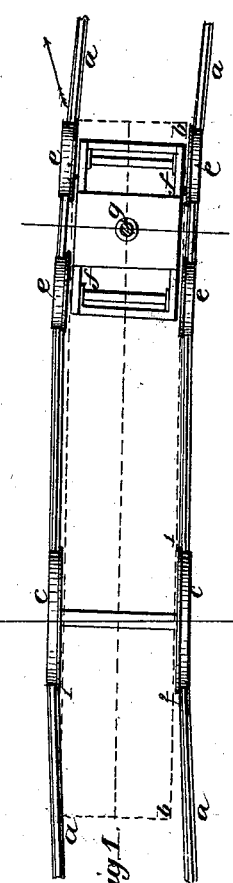
Witnesses:
Inventor:
Levi Bissell

UNITED STATES PATENT OFFICE.

LEVI BISSELL, OF NEW YORK, N. Y.

TRUCK FOR LOCOMOTIVES.

Specification forming part of Letters Patent No. 17,913, dated August 4, 1857; Reissued October 18, 1864, No. 1,794.

*To all whom it may concern:*

Be it known that I, LEVI BISSELL, of the city, county, and State of New York, have invented and made certain new and useful Improvements in Trucks for Locomotive-Engines; and I do hereby declare that the following is a full, clear, and exact description of the construction and operation of the same, reference being had to the annexed drawing, making part of this specification, wherein—

Figures 1 and 2 are plans of the ordinary six and eight wheel locomotives, showing the manner in which the wheels travel on a curved track. Fig. 3 is a similar plan showing the nature of my improvement. Fig. 4 is a side elevation of the same. Fig. 5 is a plan and Fig. 6 is an end view showing the details of my truck.

Similar marks of reference denote the same parts.

In order to illustrate fully the nature of my said invention it will be necessary briefly to show the operation of the present locomotive engines on curved rails, and show the reason why they so often run off the track, particularly when meeting with any obstruction or encountering a broken rail, the object of my invention being to retain the truck with the axles always at right angles to the rail, whether on a straight or curved track, and prevent the truck swinging around on its center pin in case of meeting with any obstruction; and to make the curvature of the rail the means for turning the truck so that the axles are parallel to the radial line of the given curve, in which position they are retained firmly until the direction of the truck again changes.

*a, a*, is the rail road track shown as on a curved line in Figs. 1, 2, and 3, and the red lines represent the radial lines of said curves at the various points. The platform *b*, or general outline of the engine, is shown in Figs. 1, 2, 3, in blue lines. The ordinary six wheel locomotive (Fig. 1,) in running around a curve assumes the position shown. The axle of the drivers *c, c*, is not on the line of the radius in consequence of the same being at right angles to the platform and the truck carries the forward end of said platform onto the curved line, hence the flanges in contact with the rail toward the sides 1, 1, grind against the rail, and the flanch on the sides toward 2, 2, are relieved and there is a constant sidewise sliding motion on the rail in consequence of forcing the drivers in a deflecting line or sidewise from that of a cylindrical forward rolling motion. The truck is constantly by this means borne to the outer side of the curve, and the engine has a tendency to go off in the direction of the arrow, particularly in case a broken rail or obstruction occurs, when the truck swivels around on its center pin throwing the locomotive off the track greatly at the risk, or to the injury, of life and limb.

The same general remarks as the above, apply to locomotives with eight or more wheels, and on account of the curvature in the rail and the character of the truck, the forward pair of drivers $d'$, $d'$, very seldom have flanches, for in such cases the flanges would bind at the points 1, 1, and be relieved at the points 2, 2, and the truck will still have the same tendency to run off the track and turn around on its center pin.

For the above reasons curves are very troublesome as well as dangerous, and there is more proportionate wear and injury to the running gear and rails in a short curve, than on several miles of straight level track. I therefore construct my truck in such a manner that the axles of the driving wheels shall be on the line of, or parallel to, the radial line of the curve, so as always to have a direct forward propelling motion, and not strain or wear the rail or flanges of the wheels, and so that two or more pairs of drivers can be fitted with flanges; consequently the center line of the locomotive in going around the curve travels as a tangent to the center of the drivers, and to accommodate the curve, I fit the truck or forward wheels in such a manner as to allow of a transverse motion, the said truck swinging laterally upon an axis of motion (*h*) located centrally between the center of the drivers and truck (or slightly forward of the same so as to give a slight tendency to the truck to run to the inner side of the curved track) thereby the axles of the truck wheels are parallel (or nearly so) to the radial line of the curved rail, and the engine runs around any given curve without much more strain either on the wheels or the track than would occur on a straight railroad; and at the same time there is no chance for the truck to turn on its center pin by any obstruction coming in contact with the wheels, and the wheels will pass over a broken rail and not be displaced unless all four wheels are simultaneously unsupported, and even then the wheels and truck being set correctly to the angular position with the drivers and the curvature of the track, will continue to move in the correct direction and pass over any obstacle or broken rail and attain the uninjured part of the track; and in running on a straight track the truck is held correctly in position and will run over quite considerable obstruction without being turned aside.

In running on either a straight or curved track one of the truck wheels often breaks off, and the truck swivels around on its center pin in consequence, and throws the engine off the track, but with my device one wheel, or even the two wheels on the opposite sides diagonally of the truck might break off and still the truck would not run off, because its position is set and it has no axis of motion around which it could swing when injured as above noted, or when meeting a broken rail or any obstruction, but is given a direct forward propulsion, and in all cases the axles of my wheels have only a strain and torsion due to the difference of length between the outer and inner rail, instead of a strain due to the binding of the flanges of the wheels from the diagonal position of the axles in addition to the above named strain, hence axles so often break when running around a curve. With my engine the friction on the rails in running around curves is avoided, and I am enabled to maintain a nearly uniform speed without any unusual strain or wear on any parts.

The outer rails on curves always have to be more or less elevated to overcome the centrifugal force, and the tendency before mentioned to run off as shown in Figs. 1 and 2, but inasmuch as this tendency is obviated in my engine, the outer rails need not be so much elevated, and in consequence of the amount of elevation usually given to the outer rails, a surplus of weight is thrown on the inner rail, particularly with slower speeds, causing considerable wear and often breakage, and there is a constant tendency to spread the track, and wear the inner sides of the rails, and the flanges, all of which are avoided by my invention.

In the drawing $e$, $e$, are the truck wheels; $f$, $f$, the truss or truck frame; $g$ is the center pin, which in my arrangement changes its character from a center of motion simply to that of a draft block or pin, while the center of motion is thrown back to the point $h$, which is slightly forward of the center between the drivers $d$, $d$.

$k$ is a block curved from the center $h$, in a similar curved slot $v$, in the top plate of the frame $f$, which slot is sufficiently long to allow of the lateral movements of the truck before mentioned when the locomotive is on a curve of the smallest radius that it ever has to travel over. The block $k$ might be bolted directly to the underside of the engine, and the curved slot $v$, would bring the axles of the wheels $e$, $e$ parallel with the radial line or nearly so, but to allow an easier motion to the parts the said block $k$ may be prevented from turning by radius bars $i$ to the center $h$. I however prefer that said radius bars $i$ should be attached as at 3, 3, to the frame $f$ (see dotted lines Fig. 3 and full lines Fig. 5,) so as to cause the truck to swing on the center $h$, in which case the block $k$ may be made use of, or the pin $g$ be fitted to move in a curved slot as shown in Fig. 5.

If the curved block $k$ and bars $i$ alone were made use of there would be a vibration of the engine on the truck when running on a straight line, and a tendency to move too far by the centrifugal force when entering a curve. I therefore obviate this difficulty by providing two inclined planes $o$, $o$, Figs. 5, 6, formed double as shown and of an angle proportioned to the weight of the forward part of the locomotive and the velocity of the same, and fit blocks $n$, $n$, on the cross bar $m$, surrounding the center pin. The position of the inclines is such that the blocks $n$, $n$ rest in the lowest part of the double inclines when the engine is on a straight track, and on coming onto a curve the inertia of the engine (tending to move in a straight line and cause the truck wheel flanges to mount the outer rail) is expended in going up the inclines $o$, $o$, as the truck moves laterally toward the inner part of the curve; and on coming onto a straight line the blocks $n$, descend to the bottom of the inclines and the engine is prevented from acquiring a sidewise or oscillating motion. The same result will be produced by fitting a thimble $p$ on the lower end of the center pin $g$, which rests on inclines $q$, suspended from the frame $f$, or said inclines $q$ might be placed centrally on the frame $f$. Rollers might be substituted for the blocks $n$ and thimble $p$; and when required springs may be applied to arrest the motion and prevent the blocks $n$ sliding too far up the inclines $o$, $o$, thus regulating the lateral motion of the truck.

I am well aware that trucks have been fitted with a lateral motion to swing on a curved slot, of which the draft head is the center, therefore I do not claim the same, and it will be apparent that my manner of attachment is the reverse of that above alluded to, for if my truck were attached by a bar extending forward of the truck the axles would be set in the wrong direction by the lateral motion, and tend to run off the track;

but by causing my truck to swing on an axis of motion located centrally or in the desired position between the drivers and truck the aforesaid difficulty is overcome and the correct position and angle between the axles of the drivers and truck wheels is insured.

I am also well aware that the front wheels of carriages have been allowed a lateral motion beneath the body of the carriage and have turned on a center of motion located between the fixed and moving axles, but in this case the draft of the animal gives direction to the said lateral moving axles, but were motion applied behind the carriage to push the same, (as is the case with the drivers and truck of the locomotive), said axle would be uncontrollable. This last mentioned device has been proposed for locomotives, in which case a single pair of wheels with a lateral motion has been used in front of the drivers and another pair behind the drivers also having a lateral motion for adapting the wheels to curves; but it will be apparent that in all these cases the lateral moving trucks are not controlled, and the body of the engine might stand and travel diagonally to the truck, particularly on a straight track, and the axles of the wheels are not retained at right angles to the track; but in my case the truck having four or more wheels, acts as a lever to bring the body of the engine into the correct position with the track, because the flanges of the two or more pairs of truck wheels coming into the straight or curved line relative with the driver or drivers cannot do so without the center $h$ being in the correct position relatively with said wheels, and insuring the correct position of the body relatively with the wheels.

I do not claim inclined planes in themselves as applied to the trucks of railroad cars as the same have been used to tend to keep the ordinary truck from turning on its center pin, except when going around a curve; therefore

What I claim as my invention and desire to secure by Letters Patent is—

1. Attaching trucks having four or more wheels to locomotive engines in the manner substantially as specified, so that the said truck is allowed a lateral motion under the engine and moves upon a center located between the drivers and the center of the truck in such a manner that the relative positions of the four or more truck wheels with the driving wheels, as determined by the straight or curved track, shall cause the body of the engine to assume the correct position relatively with said track substantially as specified.

2. I also claim the inclined planes $o$ or $q$ and blocks $n$, $n$, or $p$, or their equivalents in combination with a truck of four or more wheels having a lateral motion under the locomotive engine, the whole constructed and acting substantially as and for the purposes specified.

In witness whereof I have hereunto set my signature this twenty third day of April 1857.

LEVI BISSELL.

Witnesses:
LEMUEL W. SERRELL,
THOMAS G. HAROLD.

[FIRST PRINTED 1912.]